United States Patent Office 3,525,715
Patented Aug. 25, 1970

3,525,715
CROSS-LINKED COPOLYESTERS AND PROCESS OF MAKING THEM
Josef Hrach, Schaftenau, Austria, and Winfried Zeschmar, Beuel, Germany, assignors to Sandoz Ltd., Basel, Switzerland
No Drawing. Continuation-in-part of application Ser. No. 547,160, May 3, 1966. This application July 23, 1969, Ser. No. 844,156
Claims priority, application Austria, May 7, 1965, A 4,177/65, A 4,178/65
Int. Cl. C08g 17/08, 17/10, 33/10
U.S. Cl. 260—47                                    10 Claims

ABSTRACT OF THE DISCLOSURE

Improved fiber- and film-forming copolyesters are produced by reacting (a) an aromatic dicarboxylic acid or a dimethylester thereof, wherein the carboxyl or carboxymethyl groups are separated by at least three carbon atoms, (b) an aliphatic diol, and (c) at least one olefinic unsaturated dicarboxylic acid acting as a cross-linking agent. Preferably there is included a fourth component, (d) a diol containing a phenylene ring.

---

This application is a continuation-in-part of application Ser. No. 547,160, filed May 3, 1966, now abandoned.

The formation of polyesters possessing fiber- or film-forming properties is known and consists in the polycondensation of (a) aromatic dicarboxylic acids in which the carboxyl groups are separated by at least three carbon atoms, or their lower molecular esters, in particular alkyl esters having 1 to 4 carbon atoms, or other polyester-forming derivatives, or mixtures of these compounds, with (b) diols, or mixtures of diols, of the general formula $$HO—(CY_2)_n—OH \qquad (I)$$

where $n$ represents a whole number from 2 to 10 and Y hydrogen or lower molecular alkyl, in particular alkyl with 1 to 4 carbon atoms.

The use of unsaturated dicarboxylic acids with one olefinic double bond in the production of olefinic unsaturated copolyesters is also known. However, these processes using olefinic unsaturated dicarboxylic acids in the production of copolyesters are carried out at temperatures below the temperatures employed in the production of aromatic copolyesters containing no olefinic double bonds, that is, linear saturated aromatic copolyesters. The conventional method for producing these linear saturated aromatic copolyesters involves temperatures in the order of 260–300° C. If such temperatures were used with reactants containing an olefinic double bond, for example, maleic acid, fumaric acid, citraconic, mesaconic, itaconic, cyclohexene-(2)-dicarboxylic acid-(1,4) or 4-carboxy-cinnamic acid, the structure of the resulting copolyesters would no longer be linear. The olefinic dicarboxylic acid at the higher temperatures (260–300° C.) would act as cross-linking and/or branching components, as, for example, pentaerythritol.

These cross-linking and branching reactions during the course of the polycondensation-reaction are undesirable for the production of curable copolyesters, because the copolyesters obtained are no longer capable of cross-linking, branching or further polymerization.

As the extent of cross-linking and/or branching diminishes as the temperature during the polycondensation is decreased, it is therefore necessary to carry out the reaction at a temperature of about 200–240° C., that is, some 60° lower than for the production of linear saturated aromatic copolyesters.

Such unsaturated linear copolyesters have lower melting points than the saturated linear copolyesters, are reactive and capable of cross-linking, branching, and induced polymerization. Accordingly, they are useful as curable resins and varnishes and as intermediates for further reactions.

It has now been found that new fiber- and film-forming copolyesters having valuable properties are obtained when the aromatic dicarboxylic acids (a) referred to above, or their polyester-forming derivatives or mixtures of these, are polycondensed with (b) diols of Formula I or mixtures of these diols, with the addition (c) of small amounts of olefinic unsaturated dicarboxylic acids or their polyester-forming derivatives or mixtures of these.

The preferred aromatic dicarboxylic acids (a) are terephthalic, iso-phthalic and naphthalene-2,6-dicarboxylic acid or their mixtures. The preferred lower molecular esters of these acids are the dimethyl esters. Of the diols (b), preference is given to ethylene glycol. The olefinic unsaturated dicarboxylic acids (c) are understood to be dicarboxylic acids having at least one olefinic —C=C— double bond, for example, maleic, fumaric, citraconic, mesaconic, itaconic, cyclohexene-(2)-dicarboxylic acid-(1,4) or 4-carboxy-cinnamic acid. It is especially advantageous to include a fourth compound (d), one or more diols of the formula

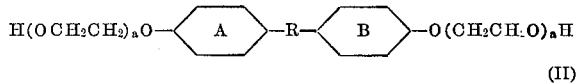

(II)

wherein $a$ represents a whole number from 1 to 10, A and B represents a phenylene ring system which may be further substituted, and R represents the direct linkage or a group of the formula

where X represents a hydrogen atom or a lower molecular, substituted or unsubstituted alkyl radical having preferably up to 4 carbon atoms. The preferred compound of Formula II is 2,2-bis[4'-(2''-hydroxyethoxy)-phenyl]-propane.

The diols (b) are generally employed in excess in relation to the aromatic dicarboxylic acids (a), for example in amounts of 2.2 to 6 mols of the diol to 1 mol of the dicarboxylic acid or acids, as is common practice in the production of polyethylene terephthalate. The olefinic unsaturated dicarboxylic acids or their polyester-forming derivatives (c) are used in amounts of up to 3 mol percent, more particularly 0.1 to 1 mol percent, again in relation to the aromatic dicarboxylic acid or acids. The diols (d) are employed with special advantage in amounts of up to 40 mol percent, or preferably 2 to 15 mol percent for the production of fiber- and film-forming copolyesters, in relation to the aromatic dicarboxylic acids. For the production of copolyesters destined for injection or extrusion moulding a higher content, for example 10 to 40 mol percent, is of advantage.

The new copolyesters are obtained by procedures similar to those for the production of linear aromatic polyesters, at temperatures in the range 260–300° C. Thus, for example, (a) terephthalic acid or a mixture of terephthalic and iso-phthalic acids or their lower molecular dialkyl esters can be polycondensed with (b) ethylene glycol in excess and (c) up to 1 mol percent of an olefinic unsaturated dicarboxylic acid or acids or their lower molecular dialkyl esters, calculated on the aromatic dicarboxylic acids, in the absence of oxygen and in the presence of esterification catalysts and, if necessary, stabilizers.

In the preferred method, as indicated above, the reaction mixture includes up to 40 mol percent of the aromatic diol (d), calculated on the aromatic carboxylic acids.

The reaction proceeds in two stages. The first, involving esterification or transesterification depending upon the reactants, is carried out preferably at normal or excess pressure and temperatures up to 270° C., and the second, or polycondensation, at reduced pressure in the temperature range of 260° to 300° C., or more particularly 270–280° C. By conducting the operation at these temperatures for the reaction times that are normal in the production of linear polyesters containing terephthalic acid one ensures that the olefinic unsaturated dicarboxylic acids react with cross-linking and/or branching. Suitable esterification catalysts for this process are the oxides of manganese, cobalt, zinc, lead and cadmium, and the salts formed by these metals and boric acid, phosphorus acid, phosphoric acid or lower molecular aliphatic carboxylic acid, preferably with 1 to 6 carbon atoms, for example zinc oxide, lead oxide, manganese tetraborate, and cobalt acetate. Organic and inorganic phosphorus compounds, for example triphenyl phosphine, tridodecyl phosphine, diphenylanthracene phosphine, tributyl phosphine, magnesium hypophosphite and disodium phosphate, minimize discoloration of the polycondensation products and improve their heat resistance.

The copolyesters thus obtained are notable for their high melting points, good crystallizing power, light color and good mechanical properties. Their distinctive characteristic is that the extent of branching and/or cross-linking is dependent on the concentration of the olefinic unsaturated dicarboxylic acid or acids. In this way improvements are obtained in the end use properties, particularly the mechanical properties such as tenacity, power of extension and elasticity. The copolyesters can be converted immediately from the reaction melt into filaments, films, granulates or other shaped materials in the known manner.

While cross-linking and branching reactions during the course of polycondensation reaction is regarded as undesirable in the production of varnishes and curable resins—such cross-linking and branching reactions render to fibers prepared from the polyesters of this invention high pilling resistance. Using diols of Formula II in addition to the components (a) to (c) superior dyeable copolyesters fibers with high pilling resistance are obtained.

A copolyester obtained in accordance with the present invention can be melt blended with another copolyester and the composite melt worked up by the same process. Carbon black or other organic or inorganic pigments, optical brightening agents, plasticizers and dulling agents such as titanium dioxide or silicon dioxide can be incorporated in the copolyester by addition to the reaction mixture either before or during the polycondensation stage.

In the following examples the parts and percentages are by weight and the temperatures in degrees centigrade. The intrinsic viscosity values given therein were determined with a solution of 1 gram of the copolyester in 100 milliliters of a 50:50 mixture of phenol and tetrachlorethane.

EXAMPLE 1

A mixture of 500 parts of terephthalic acid dimethyl ester, 300 parts of ethylene glycol and 2 parts of maleic acid dimethyl ester is heated with stirring under oxygen-free nitrogen in the presence of 0.35 part of zinc oxid and 0.17 part of triphenyl phosphine. In 2½ hours methanol and ethylene glycol distill off at temperatures up to 246°. Stirring is continued at 0.2 to 0.5 mm. Hg. pressure and a temperature of 274–276°. After 2½ hours a copolyester is formed which has an intrinsic viscosity of 0.62 and melts at 257–260°. It can be spun into almost white filaments which are suitable to cold drawing and show excellent mechanical and elastic properties.

EXAMPLE 2

A mixture of 500 parts of terephthalic acid dimethyl ester, 390 parts of ethylene glycol and 1.9 parts of fumaric acid dimethyl ester is heated with stirring under pure nitrogen in the presence of 0.35 part of manganese tetraborate and 0.17 part of triphenyl phosphine. Methanol and the excess ethylene glycol distill off in the course of 1¾ hours at temperatures up to 260°. Stirring is then continued with vacuum at a pressure of 0.2 mm. Hg and a temperature of 274–276°. After 4½ hours a copolyester is obtained which has an intrinsic viscosity of 0.65 and melting point 259–260°. It forms filaments which can be cold drawn and have very good textile properties.

EXAMPLE 3

The reaction involving interchange of ester radicals and polycondensation is performed with a mixture of 500 parts of terephthalic acid dimethyl ester, 390 parts of ethylene glycol, 50.5 parts of 2,2-bis-[4′-(2″-hydroxy-ethoxy)-phenyl]-propane and 2 parts of itaconic acid dimethylester in the presence of 0.35 part of zinc oxide and 0.17 part of triphenyl phosphine, the reaction conditions being analogous to those of the preceding examples. After 4 hours heating the product is a copolyester having an intrinsic viscosity of 0.63 and melting point 241–243°. It is of pale yellowish color and filaments thereof can be cold drawn and have excellent properties.

EXAMPLE 4

A mixture of 500 parts of terephthalic acid dimethylester, 380 parts of ethylene glycol, 101 parts of 2,2-bis-[4′-(2″-hydroxy-ethoxy)-phenyl]-propane and 2 parts of itaconic acid heated in an oxygen-free atmosphere of nitrogen with stirring in the presence of 0.35 part of zinc oxide and 0.17 part of triphenyl phosphine. Methanol and ethylene glycol distill off within 2½ hours at temperatures up to 251° during the first stage. In the second stage, the pressure is reduced to 0.2 to 0.5 mm. Hg and stirring is continued as the temperature rises to about 274–276°. After about 4 hours heating in the second stage copolymerization is completed with a copolyester product having a melting point of 236–238° and intrinsic viscosity measured as above of 0.60. It is pale yellowish in color and can be made into filaments which can be cold drawn and have excellent properties. After cold drawing, fibers of this copolyester showed a resistance to pilling about twice that of drawn polyethylene-terephthalate fibers of the same intrinsic viscosity.

What is claimed is:

1. Process for preparing fiber- and film-forming cross-linked copolyesters which comprises mixing:
   (a) a member of the group consisting of an aromatic dicarboxylic acid and a dimethyl ester of aromatic dicarboxylic acid, wherein the carboxyl- and carboxy-methyl groups are separated by at least 3 carbon atoms,
   (b) an aliphatic diol of the formula $$HO-(CY_2)_n-OH \quad \quad (I)$$

wherein $n$ represents a whole number from 2 to 10 and Y is selected from the group consisting of hydrogen and lower alkyl,
   (c) a member of the group consisting of an olefinic unsaturated dicarboxylic acid capable of cross-linking and a dimethyl ester of an olefinic unsaturated dicarboxylic acid capable of cross-linking, and
   (d) a diol of the formula

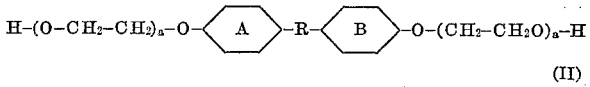

(II)

wherein $a$ is a whole number from 1 to 10, A and B each represent a phenylene ring and R represents a direct linkage or a group of the formula

wherein X represents a hydrogen atom or a lower molecular, alkyl radical, esterifying the mixture by heating in a first stage to a temperature of up to 270° C. at normal or higher pressure in the absence of oxygen and in the presence of an esterification catalyst, and then heating the reaction mixture in a second stage at subatmospheric pressure and at a temperature in the range of 260–300° C. to effect co-polycondensation and cross-linking, the initial mixture containing 0.1 to 1 mol percent of component (c) and up to 40 mol percent of component (d) based upon the amount of component (a).

2. A process as set forth in claim 1 wherein the temperature of said second stage is in the range of 270–280° C.

3. A process as set forth in claim 1 wherein component (d) is employed in an amount of 2–15 mol percent.

4. A process as set forth in claim 1 wherein $a$ is 1 and X is methyl.

5. A process as set forth in claim 1 wherein the initial mixture contains 500 parts by weight of terephthalic acid dimethyl ester, 390 parts by weight of ethylene glycol, 2 parts by weight of itaconic acid dimethyl ester and 50.5 parts by weight of 2,2-bis-[4'-(2"-hydroxy-ethoxy)-phenyl]-propane.

6. A process as set forth in claim 1 wherein the initial mixture contains 500 parts by weight of terephthalic acid dimethylester, 380 parts by weight of ethylene glycol, 101 parts by weight of 2,2-bis-[4'-(2"-hydroxy-ethoxy)-phenyl]-propane and 2 parts by weight of itaconic acid.

7. The copolyester product of claim 1.
8. The copolyester product of claim 5.
9. The copolyester product of claim 6.
10. A filament of a copolyester as set forth in claim 7.

References Cited

UNITED STATES PATENTS

| 2,410,073 | 10/1946 | Howard | 260—75 |
| 2,593,411 | 4/1952 | Caldwell | 260—75 |

OTHER REFERENCES

Morgan, P. W.: Condensation Polymers, by Interfacial and Solution Methods, Interscience Publishers, New York, N.Y., 1965, p. 338.

WILLIAM H. SHORT, Primary Examiner

L. P. QUAST, Assistant Examiner

U.S. Cl. X.R.

260—40, 75